United States Patent
Bauchot et al.

(10) Patent No.: US 7,876,201 B2
(45) Date of Patent: Jan. 25, 2011

(54) VEHICLE AUTHORIZATION METHOD AND SYSTEM

(75) Inventors: Frederic Bauchot, Saint-Jeannet (FR); Jean-Yves Clement, Saint-Jeannet (FR); Gerard Marmigere, Drap (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/212,713

(22) Filed: Sep. 18, 2008

(65) Prior Publication Data

US 2010/0066513 A1    Mar. 18, 2010

(30) Foreign Application Priority Data

Sep. 15, 2008    (EP)    ................... 08305549

(51) Int. Cl.
 *B60R 25/10*    (2006.01)
(52) U.S. Cl. .................. 340/426.1; 340/5.1; 340/5.8; 340/5.81; 340/5.82; 340/5.86
(58) Field of Classification Search .............. 340/426.1, 340/5.1, 5.2, 5.8, 5.81, 5.82, 5.83, 5.84, 5.85, 340/5.86, 5.3, 5.65, 5.24; 701/1, 32; 307/10.5; 180/287
See application file for complete search history.

(56) References Cited

U.S. PATENT DOCUMENTS

| | | | |
|---|---|---|---|
| 6,496,936 B1 * | 12/2002 | French et al. | ................... 726/7 |
| 6,985,887 B1 | 1/2006 | Sunstein et al. | |
| 7,083,087 B1 | 8/2006 | Gangi | |
| 2003/0154406 A1 * | 8/2003 | Honarvar et al. | ............ 713/201 |
| 2007/0046425 A1 * | 3/2007 | Booth | ........................ 340/5.31 |

* cited by examiner

*Primary Examiner*—Toan N Pham
(74) *Attorney, Agent, or Firm*—Schmeiser, Olsen & Watts; William H. Steinberg

(57) ABSTRACT

A vehicle authorization method and system. The method includes transmitting, by a computing system in a vehicle, a first request for enabling the vehicle for a driver. The computing system receives vehicle identification data associated with the vehicle. The computing system identifies the driver. The computing system transmits a second request for information associated with the driver. The computing system receives driver's license data associated with the driver, a list comprising authorized drivers for the vehicle, and insurance data associated with the driver and the vehicle. The computing system analyzes the vehicle identification data, the driver's license data, the list, and the insurance data. The computing system performs specified functions associated with the vehicle. The computing system generates and stores a report indicating the specified functions.

20 Claims, 4 Drawing Sheets

VEHICLE AUTHORIZATION METHOD AND SYSTEM

FIELD OF THE INVENTION

The present invention relates to a method and associated system for authorizing vehicle usage for a driver.

BACKGROUND OF THE INVENTION

Verifying system usage for specified parties typically comprises an inaccurate process with little flexibility. Accordingly, there exists a need in the art to overcome at least some of the deficiencies and limitations described herein above.

SUMMARY OF THE INVENTION

The present invention provides a method comprising:
transmitting, by a computing system in a vehicle, a first request for enabling said vehicle for a driver;
receiving, by said computing system in response to said first request, vehicle identification data associated with said vehicle;
identifying, by said computing system in response to said first request, said driver;
transmitting, by said computing system in response to said identifying, a second request for information associated with said driver of said vehicle;
receiving, by said computing system in response to said second request, drivers license data associated with said driver;
receiving, by said computing system in response to said second request, a list comprising authorized drivers for said vehicle;
receiving, by said computing system in response to said second request, insurance information data associated with said driver and said vehicle;
receiving, by said computing system, a command for analyzing said vehicle identification data, said drivers license data, said list, and said insurance information data;
analyzing, by said computing system in response to said command, said vehicle identification data, said drivers license data, said list, and said insurance information data;
performing, by said computing system based on results of said analyzing, specified functions associated with said vehicle;
generating, by said computing system, a report indicating said results and said specified functions; and
storing, by said computing system, said report.

The present invention provides a computing system comprising a processor coupled to a computer-readable memory unit, said computing system located within a vehicle, said memory unit comprising instructions that when executed by the processor implements a security method, said method comprising:
transmitting, by said computing system in said vehicle, a first request for enabling said vehicle for a driver;
receiving, by said computing system in response to said first request, vehicle identification data associated with said vehicle;
identifying, by said computing system in response to said first request, said driver;
transmitting, by said computing system in response to said identifying, a second request for information associated with said driver of said vehicle;
receiving, by said computing system in response to said second request, drivers license data associated with said driver;
receiving, by said computing system in response to said second request, a list comprising authorized drivers for said vehicle;
receiving, by said computing system in response to said second request, insurance information data associated with said driver and said vehicle;
receiving, by said computing system, a command for analyzing said vehicle identification data, said drivers license data, said list, and said insurance information data;
analyzing, by said computing system in response to said command, said vehicle identification data, said drivers license data, said list, and said insurance information data;
performing, by said computing system based on results of said analyzing, specified functions associated with said vehicle;
generating, by said computing system, a report indicating said results and said specified functions; and
storing, by said computing system, said report.

The present invention advantageously provides a simple method and associated system capable of verifying system usage for specified parties.

DETAILED DESCRIPTION OF THE INVENTION

Figure 1:
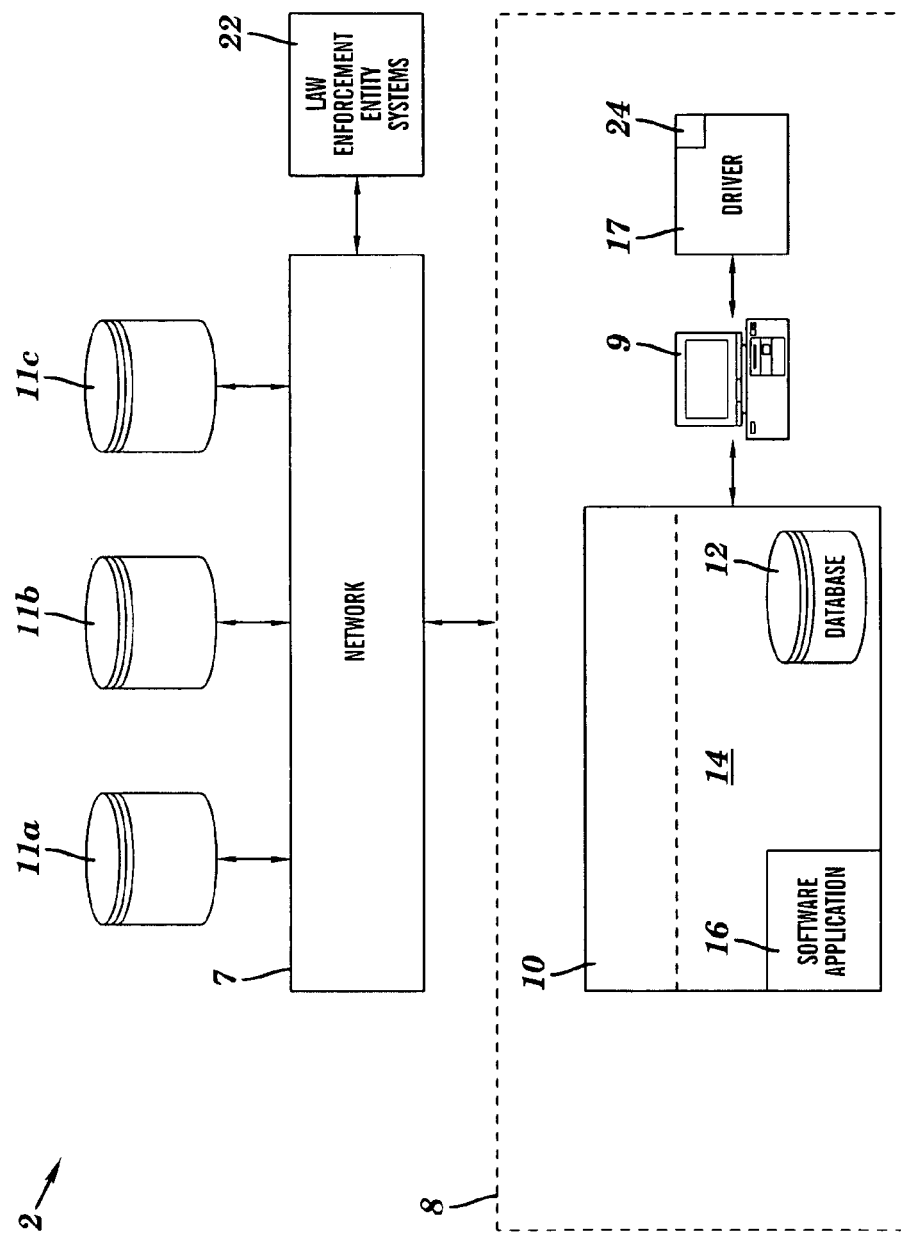
FIG. 1 illustrates a system for authorizing vehicle access and/or usage for a driver, in accordance with embodiments of the present invention

FIG. 1 illustrates a system 2 for authorizing vehicle 8 access and/or usage for a driver 17, in accordance with embodiments of the present invention. Vehicle 8 may comprise any type of vehicle including, inter alia, an automobile, a truck, a motorcycle, an aircraft, a boat, etc. System 2 allows for the following functionality associated with authorizing vehicle 8 access and/or usage:

1. Validating an ownership of a driver license belonging to driver 17.
2. Validating a validity of a driver license document from authorities.
3. Validating an ownership of a car card (e.g., vehicle registration document) by vehicle 8.
4. Validating a validity of the vehicle registration document from authorities.
5. Validating a coverage of driver 17 and vehicle 8 by an insurance policy.
6. Validating a validity of an insurance document from authorities.
7. Defining rules specifying how vehicle 8, a vehicle registration document, an insurance document, a driver license, and driver 17 could be associated.
8. Identifying situations infringing the defined rules.

9. Alerting driver 17 and/or generating specific pre-defined actions to be executed when a rule infringement is detected.

System 2 of FIG. 1 comprises databases 11a, 11b, and 11c and law enforcement entity systems 22 (e.g., police departments, security companies, the FBI, the CIA, etc) connected to a computing system 10 within a vehicle 8 through a network 7. Law enforcement entity systems 22 comprise computing systems associated with law enforcement entities. Network 7 may comprise any type of wireless network including, inter alia, the Internet, etc. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory system 14. Memory system 14 may comprise a single memory system. Alternatively, memory system 14 may comprise a plurality of memory systems. Memory system 14 may be internal to computing system 10 (e.g., as illustrated in FIG. 1) or external to computing system 10. Memory system 14 comprises a software application 16 and a database 12. Vehicle 8 comprises computing system 10, a user interface 9 connected to computing system, and a driver 17. Driver 17 may be located within vehicle 8 (i.e., as illustrated in FIG. 1) or external to vehicle 8. Driver 17 may communicate with computing system 10 via user interface 9. User interface may comprise a graphical user interface (GUI), radio frequency identification (RFID) sensors, biometric sensors, etc. Driver 17 may carry in his/her possession, RFID tags 24. Databases 11a . . . 11c may be comprised by computing systems. Database 11a is associated with a motor vehicle entity and comprises data associated with driver's licenses. The data associated with driver's licenses may include, inter alia, driver names, license validity dates, etc. Database 11b is associated with vehicle 8 and comprises data associated with vehicle 8. The data associated with vehicle 8 may include, inter alia, an ID for vehicle 8, a creation date, an owner name, a list of authorized drivers, etc. Database 11c is associated with an insurance provider entity and comprises data associated with insurance coverage for vehicle 8. The data associated with insurance coverage for vehicle 8 may include, inter alia, vehicle IDs, a police number, validity dates for insurance coverage, etc.

All drivers, formal papers (e.g., driver's license, insurance card, etc), and vehicles associated with system 2 may be equipped with RFID tags comprising the following information:
1. A formal paper type (e.g., driver' license, insurance card, registration card, etc).
2. A certificate of trusted authority associated with the entity delivering the formal paper (e.g., an insurance company, a motor vehicle authority, etc). The certificate of trusted authority may include a trusted authority public key.
3. Information related to the formal paper as described, infra.
4. A signature associated with the formal paper. The signature comprises a hashing of information associated with the formal paper encrypted with a trusted authority private key.

Each of the following formal papers may comprise associated information as specified below:
1. Vehicle formal papers.
   a. Vehicle identification string.
   b. An owner identity.
   c. Vehicle type.
   4. Charge maximum.
   5. Vehicle formal paper signature and delivering authority public key.
2. Vehicle technical control formal paper.
   a. Vehicle identification string.
   b. Vehicle type.
   c. Validity date.
   d. Vehicle technical control formal paper signature and delivering authority public key.
3. Driver license.
   a. Owner identity.
   b. Owner biometric reference.
   c. Owner birthday.
   d. License type (license for vehicle only or for truck or public transportation).
   e. Validity date.
   f. Driver License signature and delivering authority public key.
4. Insurance papers.
   a. Owner identity.
   b. Field of coverage.
   c. Expiration date.
   d. Additional driver identities.
   e. Insurance signature and insurance public key.

The following process steps illustrate executing software application 16 for authorizing vehicle 8 access and/or usage for driver 17:
1. A driver authentication process is executed to determine a driver identity. The driver authentication process may be performed by retrieving biometric characteristics (e.g., a finger print, an eye scan, etc) from driver 17. The biometric characteristic may be retrieved by biometric sensors (e.g., a finger print scanner, an eye scanner, etc) comprised by user interface 9.
2. A vehicle authentication process is executed to verify characteristics of vehicle 8.
3. A driver's license authentication process is executed to verify characteristics of a driver's license.
4. An insurance authentication process is executed to verify characteristics of insurance coverage for vehicle 8 and driver 17.
5. An analysis process is executed to analyze data retrieved in steps 1-4.
6. Functions associated with vehicle are executed based on the analysis process.

System 2 verifies the following static relationships:
1. A correspondence between driver 17 and a driver's license used with validation.
2. A correspondence between a formal paper and a vehicle ID and validation.
3. A correspondence between insurance, driver 17 (or a group), and vehicle 8.

Computing system 10 is configurable via user interface 9 so that if a mismatch in correspondences as described, supra, is detected the following actions could be executed:
1. Vehicle 8 will not start.
2. The mismatch is displayed via user interface 9.
3. The mismatch is displayed via user interface 9 and must be acknowledged by driver 17.
4. The mismatch generates and transmits an alert to an authority (e.g., law enforcement entities 22, insurance companies, fire departments, etc).

Computing system 10 verifies the following dynamic relationship against a specific trusted server (e.g., a new driver may be temporarily added to an insurance policy):
1. System 2 reads a URL of an insurance server from the insurance formal paper to retrieve temporary or new data.

Computing system 10 may receive updates for following elements:
1. Update of a driver license used.
2. Update of insurance information for a driver or group supported.

Figure 2:
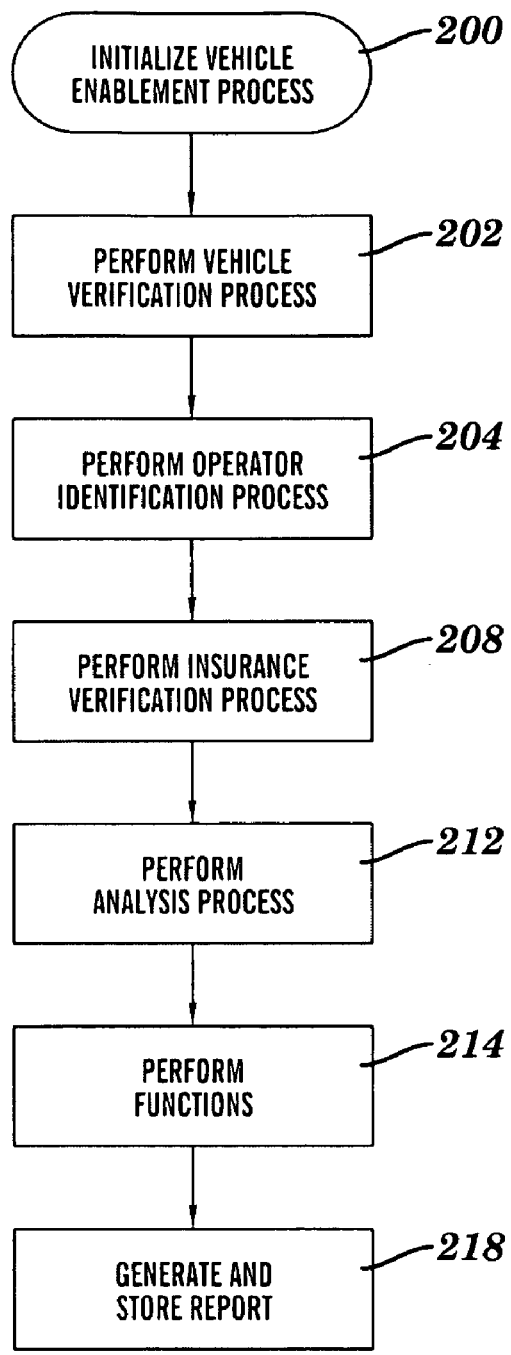
FIG. 2 illustrates a flowchart describing an algorithm used by the system of FIG. 1 for authorizing vehicle access and/or usage for a driver, in accordance with embodiments of the present invention.

FIG. 2 illustrates a flowchart describing an algorithm used by system 2 of FIG. 1 for authorizing vehicle access and/or usage for a driver, in accordance with embodiments of the present invention. In step 200, a computing apparatus in a vehicle (e.g., computing apparatus 10 in vehicle 8 of FIG. 1) initializes a vehicle enablement process. The vehicle enablement process may be initialized by commanding the computing system to transmit a first request for enabling the vehicle for a driver (e.g., driver 17 in FIG. 1). The command may be executed by the driver, an owner of the vehicle, etc. In step 202, a vehicle verification process is performed. The vehicle verification process comprises receiving and analyzing (i.e. by the computing system in response to the first request) vehicle identification data associated with vehicle. The vehicle verification process may additionally comprise receiving and analyzing a list comprising authorized drivers for the vehicle. The vehicle identification data and list of authorized drivers may be received from any of databases 11a . . . 11c of FIG. 1. In step 204, the computing system identifies in response to the first request, the driver. The driver may be identified by retrieving and analyzing biometrics data (e.g., finger print data, eye scan data, etc) from the diver. The biometrics data may be retrieved by biometrics scanners in or on the vehicle. The driver may be additionally identified by transmitting a request for information associated with the driver and receiving and analyzing drivers license data associated with the driver. The driver's license data may be compared to the biometrics data for verification of the driver. The driver's license data may be retrieved from RFID tags on the driver and/or a license document. Additionally, the driver's license data may be retrieved from any of databases 11a . . . 11c of FIG. 1. In step 208, an insurance verification process is performed. The insurance verification process comprises receiving (i.e., by the computing system) insurance information data associated with the driver and the vehicle. The insurance information data may be retrieved from RFID tags on the driver and/or a insurance document. Additionally, the insurance information data may be retrieved from any of databases 11a . . . 11c of FIG. 1. In step 212, an analysis process is performed. The analysis process includes analyzing (i.e., by said computing system) the vehicle identification data, the drivers license data, the list of authorized drivers, and the insurance information data.

The analysis process may include the following steps:
1. The computing system validates the vehicle identification data, the driver's license data, the list of authorized drivers, and the insurance information data. The vehicle identification data, the driver's license data, the list of authorized drivers, and the insurance information data may be validated by communications with various associated entities.
2. The computing system determines associations between the vehicle identification data, the driver's license data, the list of authorized drivers, and the insurance information data.
3. The computing system compares the associations between the vehicle identification data, the driver's license data, the list of authorized drivers, and the insurance information data to a set of predetermined rules.
4. The computing system identifies based on results of the comparing process in step 3, an infringement of any of the set of predetermined rules.

In step 214, the computing system performs specified functions associated with the vehicle based on results of the analysis process of step 212. The specified functions may be determined by an action table stored in the computing system as described, infra, as described with reference to FIG. 3. If the results of the analysis process of step 212 indicated a problem the specified functions may include the following scenarios:
1. The computing system generates and presents an alert to the driver.
2. The computing system generates and presents an alert to an owner of said vehicle. In this scenario, the owner is not the driver.
3. The computing system generates and transmits an alert for an insurance company associated with insurance information data.
4. The computing system generates and transmits an alert to a law enforcement agency.
5. The computing system prevents entry to the vehicle. Entry may be prevented by automatically locking the vehicle doors.
5. The computing system activates an alarm on the vehicle.
6. The computing disables the vehicle. The vehicle may be disabled by, inter alia:
   a. Preventing the vehicle from starting.
   b. Engaging a braking system of the vehicle.

In step 220, a report indicating the results of step 212 and the specified functions performed in step 218 is generated and stored in the computing system.

Figure 3:
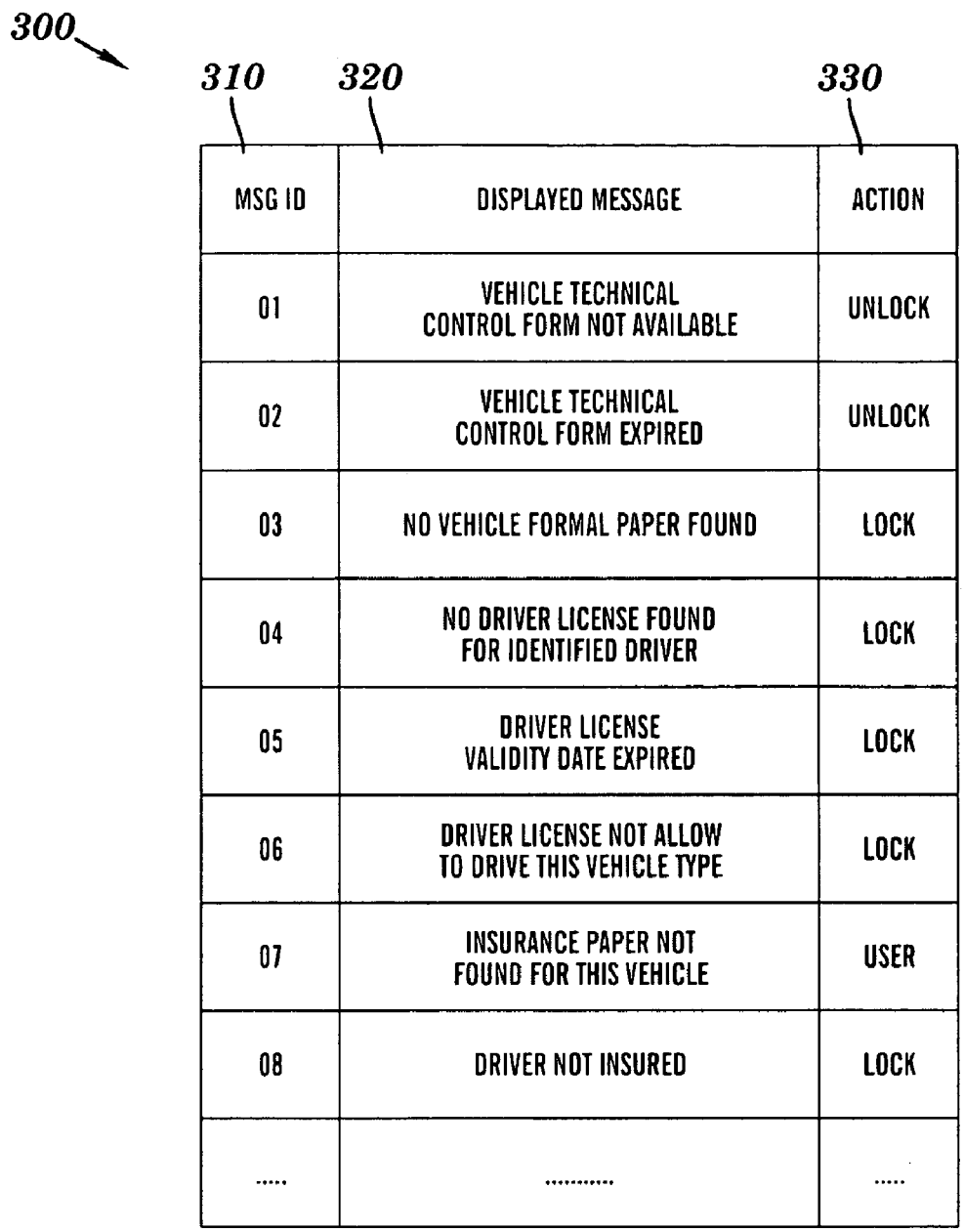
FIG. 3 illustrates an action table stored in the computing system of FIG. 1, in accordance with embodiments of the present invention.

FIG. 3 illustrates an action table 300 stored in computing system 10 of FIG. 1, in accordance with embodiments of the present invention. Action table 300 is used for associating message IDs 310 with displayed messages 320 and actions 330 to be executed. Displayed messages 320 specify mismatch in correspondences as described with reference to FIG. 1. Actions 330 are to be executed if an associated displayed message 320 is displayed. Action 330 "unlock" may comprise an action associated with a display of information or may comprise an action of unlocking a door for the vehicle. Action 330 "lock" may comprise an action associated with a display of information or may comprise an action of locking a door for the vehicle or preventing a vehicle from being started.

Figure 4:
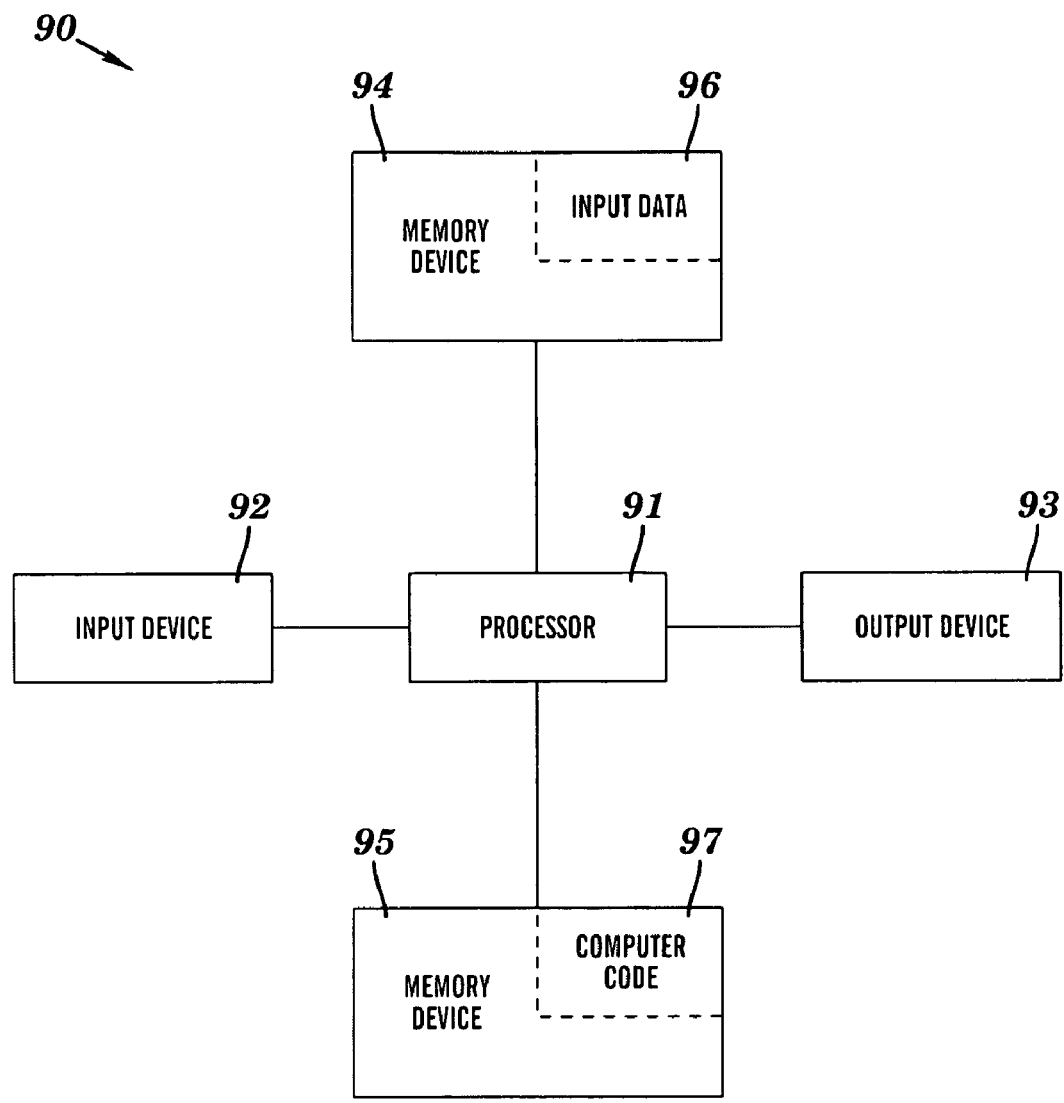
FIG. 4 illustrates a computer apparatus used for authorizing vehicle access and/or usage for a driver, in accordance with embodiments of the present invention.

FIG. 4 illustrates a computer apparatus 90 (e.g., computing system 10 of FIG. 1) used for authorizing vehicle access and/or usage for a driver, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for authorizing vehicle access and/or usage for a driver. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to authorize vehicle access and/or usage for a driver. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for authorizing vehicle access and/or usage for a driver. In another embodiment, the invention provides a business method that performs the process steps of the invention on a subscription, advertising, and/or fee basis. That is, a service provider, such as a Solution Integrator, could offer to perform a process for authorizing vehicle access and/or usage for a driver. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   transmitting, by a computing system in a vehicle, a first request for enabling said vehicle for a driver;
   receiving, by said computing system in response to said first request, vehicle identification data associated with said vehicle;
   identifying, by said computing system in response to said first request, said driver;
   transmitting, by said computing system in response to said identifying, a second request for information associated with said driver of said vehicle;
   receiving, by said computing system in response to said second request, drivers license data associated with said driver;
   receiving, by said computing system in response to said second request, a list comprising authorized drivers for said vehicle;
   receiving, by said computing system in response to said second request, insurance information data associated with said driver and said vehicle;
   receiving, by said computing system, a command for analyzing said vehicle identification data, said drivers license data, said list, and said insurance information data;
   analyzing, by said computing system in response to said command, said vehicle identification data, said drivers license data, said list, and said insurance information data;
   performing, by said computing system based on results of said analyzing, specified functions associated with said vehicle;
   generating, by said computing system, a report indicating said results and said specified functions; and
   storing, by said computing system, said report.

2. The method of claim 1, wherein said identifying said driver comprises:
   receiving, by said computing system via biometrics sensors, biometrics data associated with said driver; and
   analyzing, by said computing system, said biometrics data.

3. The method of claim 1, wherein said analyzing comprises:
   validating, by said computing system, said vehicle identification data, said drivers license data, said list comprising authorized drivers for said vehicle, and said insurance information data; and
   determining, by said computing system, associations between said vehicle identification data, said drivers license data, said list comprising authorized drivers for said vehicle, and said insurance information data.

4. The method of claim 3, wherein said computing system comprises a set of predetermined rules, and wherein said analyzing further comprises:
   comparing, by said computing system, said associations, said vehicle identification data, said drivers license data, said list comprising authorized drivers for said vehicle, and said insurance information data to said set of predetermined rules; and
   identifying, by said computing system based on results of said comparing, an infringement of any of said set of predetermined rules.

5. The method of claim 1, wherein said vehicle identification data comprises an identification string for said vehicle, and an owner of said vehicle.

6. The method of claim 1, wherein said drivers license data comprises a name of said driver, a class of a driver's license belonging to said driver, and an expiration date associated with said driver's license.

7. The method of claim 1, wherein said insurance information data comprises policy number, a valid data range for insurance, and an identification string for said vehicle.

8. The method of claim 1, wherein said results of said analyzing indicates a problem, and wherein said performing said specified functions comprises:
   generating, by said computing system, an alert for said driver; and
   presenting, by said computing system, said alert to said driver.

9. The method of claim 1, wherein said results of said analyzing indicates a problem, and wherein said performing said specified functions comprises:
   generating, by said computing system, an alert for an owner of said vehicle, wherein said owner is not said driver; and
   transmitting, by said computing system, said alert to said owner.

10. The method of claim 1, wherein said results of said analyzing indicates a problem, and wherein said performing said specified functions comprises:
- generating, by said computing system, an alert for an insurance company associated with said insurance information data; and
- transmitting, by said computing system, said alert to said insurance company.

11. The method of claim 1, wherein said results of said analyzing indicates a problem, and wherein said performing said specified functions comprises:
- generating, by said computing system, an alert for a law enforcement agency; and
- transmitting, by said computing system, said alert to said law enforcement agency.

12. The method of claim 1, wherein said results of said analyzing indicates a problem, and wherein said performing said specified functions comprises:
- preventing, by said computing system, entry to said vehicle.

13. The method of claim 1, wherein said results of said analyzing indicates a problem, and wherein said performing said specified functions comprises:
- activating, by said computing system, an alarm on said vehicle.

14. The method of claim 1, wherein said results of said analyzing indicates a problem, and wherein said performing said specified functions comprises:
- disabling, by said computing system, said vehicle.

15. A computer program product, comprising a computer storage medium comprising a computer readable program code embodied therein, said computer readable program code configured to perform the method of claim 1 upon being executed by a processor of said computing system.

16. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

17. A computing system comprising a processor coupled to a computer-readable memory unit, said computing system located within a vehicle, said memory unit comprising instructions that when executed by the processor implements a vehicle authorization method, said method comprising:
- transmitting, by said computing system in said vehicle, a first request for enabling said vehicle for a driver;
- receiving, by said computing system in response to said first request, vehicle identification data associated with said vehicle;
- identifying, by said computing system in response to said first request, said driver;
- transmitting, by said computing system in response to said identifying, a second request for information associated with said driver of said vehicle;
- receiving, by said computing system in response to said second request, drivers license data associated with said driver;
- receiving, by said computing system in response to said second request, a list comprising authorized drivers for said vehicle;
- receiving, by said computing system in response to said second request, insurance information data associated with said driver and said vehicle;
- receiving, by said computing system, a command for analyzing said vehicle identification data, said drivers license data, said list, and said insurance information data;
- analyzing, by said computing system in response to said command, said vehicle identification data, said drivers license data, said list, and said insurance information data;
- performing, by said computing system based on results of said analyzing, specified functions associated with said vehicle;
- generating, by said computing system, a report indicating said results and said specified functions; and
- storing, by said computing system, said report.

18. The computing system of claim 17, wherein said identifying said driver comprises:
- receiving, by said computing system via biometrics sensors, biometrics data associated with said driver; and
- analyzing, by said computing system, said biometrics data.

19. The computing system of claim 17, wherein said analyzing comprises:
- validating, by said computing system, said vehicle identification data, said drivers license data, said list comprising authorized drivers for said vehicle, and said insurance information data; and
- determining, by said computing system, associations between said vehicle identification data, said drivers license data, said list, and said insurance information data.

20. The computing system of claim 19, wherein said computing system comprises a set of predetermined rules, and wherein said analyzing further comprises:
- comparing, by said computing system, said associations, said vehicle identification data, said drivers license data, said list comprising authorized drivers for said vehicle, and said insurance information data to said set of predetermined rules; and
- identifying, by said computing system based on results of said comparing, an infringement of any of said set of predetermined rules.

* * * * *